(12) United States Patent
Lindskog et al.

(10) Patent No.: US 9,079,462 B2
(45) Date of Patent: Jul. 14, 2015

(54) SYSTEM, METHOD AND COMPUTER PROGRAM OF ESTIMATING TIRE PRESSURE DEVIATIONS

(75) Inventors: Peter Lindskog, Linköping (SE); Anders Stenman, Linköping (SE); Tony Gustafsson, Askim (SE); Peter Hall, Linköping (SE)

(73) Assignee: Nira Dynamics AB, Linkoping (SE)

( * ) Notice: Subject to any disclaimer, the term of this patent is extended or adjusted under 35 U.S.C. 154(b) by 1222 days.

(21) Appl. No.: 12/531,686

(22) PCT Filed: Mar. 16, 2007

(86) PCT No.: PCT/EP2007/002369
§ 371 (c)(1),
(2), (4) Date: Mar. 19, 2010

(87) PCT Pub. No.: WO2008/113381
PCT Pub. Date: Sep. 25, 2008

(65) Prior Publication Data
US 2010/0164704 A1      Jul. 1, 2010

(51) Int. Cl.
*B60C 23/00* (2006.01)
*B60C 23/06* (2006.01)
(52) U.S. Cl.
CPC ............. *B60C 23/061* (2013.01); *B60C 23/062* (2013.01)
(58) Field of Classification Search
None
See application file for complete search history.

(56) References Cited

U.S. PATENT DOCUMENTS

| | | | |
|---|---|---|---|
| 4,574,267 A | 3/1986 | Jones | |
| 5,553,491 A | 9/1996 | Naito et al. | |
| 5,557,552 A * | 9/1996 | Naito et al. | 702/148 |
| 5,583,483 A | 12/1996 | Baumann | |
| 6,109,099 A | 8/2000 | Kawai et al. | |
| 6,501,373 B2 | 12/2002 | Kitano | |
| 6,877,371 B1 * | 4/2005 | Walenty et al. | 73/146.5 |

(Continued)

FOREIGN PATENT DOCUMENTS

| | | |
|---|---|---|
| DE | 40 19 501 A1 | 4/1991 |
| DE | 198 59 225 A1 | 7/1999 |

(Continued)

OTHER PUBLICATIONS

PCT International Search Report for PCT Counterpart Application No. PCT/EP2007/002369 containing Communication relating to the Results of the Partial International Search Report, 2 pgs., (Dec. 3, 2007).

(Continued)

*Primary Examiner* — Firmin Backer
*Assistant Examiner* — Brian Wilson
(74) *Attorney, Agent, or Firm* — Blakely, Sokoloff, Taylor & Zafman LLP (57) ABSTRACT

The invention provides a system, a method and a computer program of estimating tire pressure deviations in a number of tires of a vehicle wherein a plurality of possible constellations of one or more pressure deviating tires exists. The system comprises a plurality of pressure deviation detectors (11), wherein each of the detectors (11) is adapted to detect at least one of the pressure deviating tire constellations. The system further comprises an output unit (12) which is adapted to provide for a warning if one of the pressure deviation detectors (11) detects at least one of the pressure deviating tire constellations.

14 Claims, 9 Drawing Sheets

(56) References Cited

U.S. PATENT DOCUMENTS

| | | |
|---|---|---|
| 7,203,612 B2 | 4/2007 | Kobe et al. |
| 8,494,704 B2 | 7/2013 | Hall et al. |
| 8,554,498 B2 | 10/2013 | Gustavsson et al. |
| 2002/0024432 A1* | 2/2002 | Lin et al. ............... 340/442 |
| 2002/0157461 A1 | 10/2002 | Schmidt et al. |
| 2003/0050743 A1 | 3/2003 | Caretta et al. |
| 2003/0187555 A1 | 10/2003 | Lutz et al. |
| 2003/0227380 A1 | 12/2003 | Piech et al. |
| 2004/0056528 A1 | 3/2004 | Naruse |
| 2004/0111276 A1 | 6/2004 | Inge |
| 2004/0164140 A1 | 8/2004 | Voeller et al. |
| 2004/0260436 A1 | 12/2004 | Kin |
| 2005/0159534 A1 | 7/2005 | Ronlan |
| 2005/0192727 A1 | 9/2005 | Shostak et al. |
| 2006/0001533 A1 | 1/2006 | Bessho et al. |
| 2006/0025897 A1 | 2/2006 | Shostak et al. |
| 2006/0276984 A1 | 12/2006 | Kobe et al. |
| 2007/0061100 A1 | 3/2007 | Hall et al. |
| 2007/0186634 A1 | 8/2007 | Burghardt et al. |
| 2010/0042549 A1 | 2/2010 | Adamczyk et al. |
| 2010/0191483 A1 | 7/2010 | Gustavsson et al. |
| 2010/0204869 A1 | 8/2010 | Hall et al. |
| 2014/0012535 A1 | 1/2014 | Hall et al. |

FOREIGN PATENT DOCUMENTS

| | | |
|---|---|---|
| DE | 103 31 585 A1 | 3/2005 |
| DE | 10 2005 004910 | 9/2005 |
| EP | 0 578 826 A1 | 1/1994 |
| EP | 0 783 982 A1 | 7/1997 |
| JP | 05-055322 A | 3/1993 |
| JP | 5133831 A | 5/1993 |
| JP | 2836652 B2 | 12/1998 |
| JP | 2000-318417 A | 11/2000 |
| WO | WO 2005/005173 A1 | 1/2005 |
| WO | WO 2007/054585 | 5/2007 |

OTHER PUBLICATIONS

PCT Written Opinion of the International Search Authority for PCT/EP2007/002369, 5 pgs. (Sep. 16, 2009).

PCT International Preliminary Report on Patentability for PCT Application No. PCT/EP2007/002369, 6 pgs. (Sep. 22, 2009).

* cited by examiner

Fig. 9 ously. Direct monitoring systems are usually very precise, but expensive due to the required additional measuring equipment. Indirect systems are cheaper, but it is naturally more difficult to obtain reliable and useful results.

SYSTEM, METHOD AND COMPUTER PROGRAM OF ESTIMATING TIRE PRESSURE DEVIATIONS

CROSS-REFERENCE TO RELATED APPLICATION

This patent application is a U.S. National Phase application under 35 U.S.C. §371 of International Application No. PCT/EP2007/002369, filed on Mar. 16, 2007, entitled SYSTEM, METHOD AND COMPUTER PROGRAM OF ESTIMATING TIRE PRESSURE DEVIATIONS.

FIELD OF THE INVENTION

The invention relates in general to monitoring the tire pressure of a number of tires in a vehicle, and in particular to a system, method and computer program for estimating tire pressure deviations in a plurality of tires in a vehicle.

BACKGROUND OF THE INVENTION

Two main issues of automotive design today concern the improvement of driving safety and fuel consumption efficiency. Suboptimal tire pressure may have negative impact on both of these aspects: on the one hand, the contact surface of an incorrectly inflated tire with the street is changed, possibly causing a longer braking distance, worsened side stability and handling of the vehicle and even an increased heat generation between tire and street; on the other hand, the tire pressure directly influences the fuel consumption.

Therefore, tire pressure monitoring systems are increasingly integrated in the vehicle electronic in order to warn the vehicle driver of any significant deviation from normal tire pressure.

Tire pressure monitoring systems in general work either directly (i.e. with a tire pressure sensor) or indirectly (i.e. having no tire pressure sensor). Direct monitoring systems are usually very precise, but expensive due to the required additional measuring equipment. Indirect systems are cheaper, but it is naturally more difficult to obtain reliable and useful results.

Indirect tire pressure monitoring systems mostly use for their estimations signals from existing sensors measuring, for instance, the angular velocity of the wheels, which are used by antilock braking systems (ABS). Based on the angular velocity signals the systems may in particular calculate changes in the wheel radii or observe the spectrum of the angular velocity signals. From this, the system may deduce information about tire pressure derivations. A conventional indirect tire pressure monitoring system is described in U.S. Pat. No. 6,501,373 B2.

SUMMARY OF THE INVENTION

It is an object of the invention to improve the performance of indirect tire pressure monitoring systems.

The invention achieves this object by providing a method, system and computer program according to the independent claims.

The dependent claims include further aspects of the invention.

BRIEF DESCRIPTION OF THE DRAWINGS

The invention is described with reference to the accompanying drawings in which.

DETAILED DESCRIPTION OF THE PREFERRED EMBODIMENTS

Indirect tire pressure monitoring is a technique known to the person skilled in the art from general knowledge or from the cited reference. Details of this technique are therefore only described as far as they directly concern the invention.

The invention is provided for use in vehicles having at least two wheels. Vehicles, in general, comprise any type of vehicle having tires, such as cars, bikes, trucks, trailers, and the like. Depending on the number of vehicle tires, a defined number of possible constellations of one or more tires having pressure deviations exist. As an example, fifteen different pressure deviating tire constellations may occur for a vehicle having four tires:

one single tire may be deviating in pressure, namely the front left (FL) one, the front right (FR) one, the rear left (RL) one, or the rear right (RR) one (thus, in total four different "1 W constellations");

two tires may be deviating in pressure at the same time, namely the two tires of one axle (FL and FR, RL and RR), the two tires of one vehicle side (FL and RL, FR and RR), or the two tires diagonally opposite (FL and RR, FR and RL) (thus, in total six different "2 W constellations");

three tires may be deviating in pressure at the same time, namely all tires except FL, FR, RL or RR (thus, in total four different "3 W constellations");

four tires may be deviating in pressure at the same time (thus, in total one "4 W constellation").

In this context, a "pressure deviation" in a tire is considered to be the case when the tire pressure deviates significantly from the normal tire pressure or the pressure of one or more other tires. Since indirect pressure monitoring systems have no tire pressure measuring possibility, the "normal" tire pressure is usually determined during a calibration phase. Of course, the "significance" of a tire pressure deviation depends on the individual application and vehicle condition; for example, a relative pressure deviation of 20% compared to the normal tire pressure or a pressure difference of 10% between two tires may be considered as significant deviations.

In order to reliably detect each of the above pressure deviating tire constellations, the invention uses a plurality of pressure deviation detectors.

The pressure deviation detectors may in one embodiment of the invention be software-implemented or hardware-implemented as separate and individual units which detect pressure deviations for example based on data from sensors measuring the wheel angular velocity (as used e.g. in ABS). In most embodiments, one or more analysis modules pre-process the measuring data before it is provided to the pressure deviation detectors, e.g. using a roll radius based analysis (e.g. wheel radius analysis) and/or wheel spectrum analysis. For example, a wheel radius analysis (WRA) module and/or a wheel spectrum analysis (WSA) module may be used to provide to the pressure deviation detectors data for wheel-relative and/or wheel-individual pressure monitoring. Further data, e.g. relating to vehicle or driving conditions (including e.g. vehicle velocity, ambient temperature, load information, driving state information, etc.), may be also provided to the detectors in some embodiments of the invention; those data may be obtained for example from the vehicle CAN bus via specific modules of an indirect tire pressure monitoring system.

Mostly, at least one detector is provided for each pressure deviating tire constellation. If so, each of the tire pressure detectors is designed to detect a particular one of the possible pressure deviating tire constellations. The provision of at least one detector per pressure deviating tire constellation allows an optimisation of each detector for detecting a particular pressure deviating tire constellation. Such an optimisation may include for example the provision of the relevant input signals for the specific constellation to the detectors, or the adaptation of detector parameters to specific conditions of the corresponding tires (e.g. the specific tire abrasion, the effects of an unbalanced load etc.). It doesn't matter if the performance of a detector is insufficient to work in relation to other pressure deviating tire constellations than the one it is optimised for, since those other constellations will be detected by their "own" detectors. According to one embodiment of the invention, the detectors call a warning only if they detect the pressure deviating tire constellation they are adapted to, such that the existence of a particular pressure deviating tire constellation can be deduced from the fact that a particular detector calls a warning.

In some cases, however, there exist more possible pressure deviating tire constellations than detectors, such that at least some of the detectors must be adapted to detect more than one single pressure deviating tire constellation.

According to further embodiments of the invention, further detectors are provided which are adapted to detect different pressure deviation situations. Examples of different pressure deviation situations comprise rapid pressure loss or rapid pressure increase situations, slow pressure loss or slow pressure increase situations, asymmetric pressure deviation situations, flat tire situations due to rapid and large pressure loss, or leakage situations due to pressure leakage during calibration. Further, pressure deviation situations may include aggravating situations which complicate the correct detection of pressure deviations. Such aggravating situations may for example include situations shortly after the initiation of calibration, or may arise for a mixed tire set with tires of different sizes. Of course, different pressure deviation situations may arise at the same time, for example may a rapid pressure loss situation occur at the same time as a slow pressure increase situation at another tire. Some embodiments of the invention provide detector types which are each optimised to detect a particular pressure deviation situation or a combination of pressure deviation situations.

The use of different detector types will in some embodiments of the invention enhance the tire pressure estimation performance, for example if one detector of each type is provided for each pressure deviating tire constellation. That is, one detector of each type is adapted to detect the same pressure deviating tire constellation, such that each detector is optimised to detect one particular pressure deviating tire constellation for one particular pressure deviation situation. Since an optimised detector is provided for each pressure deviating tire constellation/deviation situation scenario, pressure deviations will be detected with high reliability.

Of course, this approach requires a great total number of detectors. For a four wheel vehicle, for example, there exist 15 possible pressure deviating tire constellations; assumed that only three detector types are provided for each constellation, this makes a total number of 45 detectors. It might therefore for some applications be advantageous to use only a small number of different detector types per possible constellation, e.g. one detector type for rapid pressure loss/increase and one type for slow pressure loss/increase; alternatively, different detector types might be provided only for some possible pressure deviating tire constellations. Consequently, some detectors must be able to cope with a number of different pressure deviation situations.

Another alternative embodiment uses one detector, no matter of which type, per possible pressure deviating tire constellation, and provides in addition to those constellation-optimised detectors one set of detectors of the different types which are not optimised for detecting a specific pressure deviating tire constellation, but only for detecting a specific pressure deviation situation. Results of the one detector group might then be provided to the other detector group, such that the detectors may for example adapt certain detector parameters etc. This embodiment reduces the total detector number significantly.

Of course, a combination of the above outlined arrangements may also be provided. For example, some detectors of different types might be provided per possible pressure deviating tire constellation, and some detectors of other types might additionally be used without optimisation to a particular pressure deviating tire constellation. Such an additional detector which is not optimised to a particular pressure deviating tire constellation may be, for instance, a detector for detecting mixed tire sets, since this detector type will normally work reliably without further optimisation to a particular tire constellation.

In order to render the inventive system, method or computer program more flexible, different detector parameters of individual detectors (e.g. threshold parameters which are for example used for determining if a pressure deviation should cause a warning or not) or other system parameters are—e.g. regularly or in reaction to an external event—adapted to driving or vehicle conditions, ambient temperature, user commands or other external commands etc. according to one embodiment of the invention. For example, a temperature compensation of the detector results by changing detector parameters in dependence on the ambient temperature might improve the performance of the detectors and the overall system. Further, individual detectors might be activated and/or deactivated in order to adapt the tire pressure monitoring to a specific vehicle model, to a specific market or to certain legal regulations.

In one embodiment a control unit is provided for realising the above features that is implemented, for instance, as a software routine, a CPU or an ECU. The control unit may in one embodiment respond to external requests and/or react to driving or vehicle conditions or detected pressure deviations.

Another feature the control unit might provide according to one embodiment relates to a plausibility analysis of the detector results. For example, detector results detecting a tire pressure deviation scenario for which they are not optimised or warnings when present WRA and WSA data are sufficiently close to the calibration conditions may be sorted out; also, detector results might be adapted to the current vehicle condition in consideration of vehicle load, weather conditions, calibration situations etc.; or in order to sort out nuisance warnings it may be checked whether a pressure deviating tire constellation has been detected for a sufficiently long time period before calling a warning.

Further, the control unit may in some embodiments be responsible for forwarding output data to an output unit.

Of course, the above described features of the control unit might also be implemented by other units, for example the output unit or the detectors themselves.

An output unit may according to the invention perform the task of providing output data obtained from a control unit or directly from the detectors to an external unit, program or application. The external units or programs may, for instance, store the output data in a memory unit or display the output data to a vehicle user.

In one embodiment, the output unit is an OR logic which obtains input data from the detectors.

The provided output data comprise a tire pressure deviation warning, if a pressure deviation is detected. In some embodiments of the invention, the output data further specifies the detected pressure deviating tire constellation, that is, the number and position of pressure deviating tires; some embodiments of the invention additionally provide information about a detected pressure deviation situation. According to some embodiments of the invention, the provided output data comprise information about a warning level that is might be determined e.g. by the detectors, by the control unit or by the output unit. A first warning level may indicate e.g. a slow pressure drop which allows a user to drive on for a limited time period without any substantial risk; a second warning level may indicate a rapid or large pressure loss which should cause the user to stop his or her vehicle as soon as possible. Any further warning levels might also be implemented. If no significant pressure deviation is detected, either no data is provided to the output unit, or it is indicated that everything is normal.

For some embodiments of the invention, there exist vehicle conditions or situations when the tire pressure cannot be monitored, for example outside certain velocity ranges. In such cases, the output unit may output the information that tire pressure monitoring is momentarily inactive.

Figure 1:
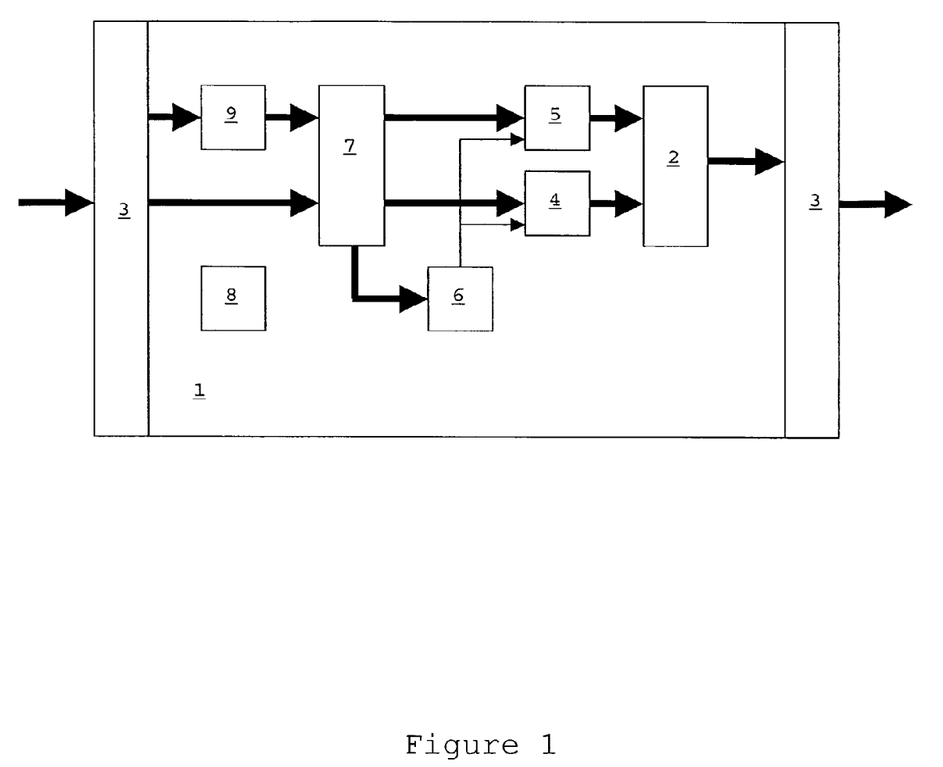
FIG. 1 shows a schematic data flow diagram of a tire pressure monitoring system according to an embodiment of the invention.

A schematic data flow diagram of an embodiment of an inventive tire pressure monitoring system 1 is shown in FIG. 1.

The tire pressure monitoring system 1 may for example be a standardised software component which is integrated in an electronic control unit of a vehicle. The system 1 obtains data by means of an application program interface (API) 3. These obtained data may include on the one hand signals from the vehicle CAN bus etc., e.g. describing temperature changes, driving situations (speed, braking . . . ), road conditions or control commands from external devices. In order to make those signals available to the modules of system 1, they are stored according to the illustrated embodiment in a memory unit 9. On the other hand, the obtained data may include measuring data directly obtained from the vehicle's sensors, such as rotational speed sensors (as existent in the vehicle's ABS) which indicate the angular velocity of the rotating wheels.

A diagnosis control module 8 performs internal system and input signal checks and sets system status and error codes. If a severe error occurs, this module can disable the tire pressure monitoring system.

The obtained data are input to a signal pre-processing module 7 which pre-filters signals in order to remove disturbances and offsets and pre-computes signals and quantities used by other modules.

Then, the pre-processed signals output by the signal pre-processing module 7 are input to a unit for roll radius based indirect tire pressure monitoring, here exemplary in form of a wheel radius analysis (WRA) module 5, and to a wheel spectrum analysis (WSA) module 4. Optionally, information is input to the WRA module 5 and the WSA module 4 informing about special driving conditions (e.g. driving with snow chains etc.) detected by a dynamic state detector 6 based on data from the signal pre-processing module 7 which will be considered for the data analysis.

In essence, a WRA as executed in the WRA module 5 is based on the fact that the wheel speed of a wheel depends on the respective wheel radius: the wheel speed increases with decreasing wheel radius. Changes in the wheel radii contain information about changes in the tire pressure of the corresponding wheels, but may also reflect vehicle load changes and surface changes or react on driving forces (acceleration, braking, forces in curves etc.).

Based on the wheel angular velocity signals obtained from module 7, the WRA module 5 estimates changes in the relative wheel radii in one, two and three wheels, but not in all four wheels simultaneously since the approach mostly relies on relative wheel radius estimates rather than absolute ones. In order to obtain wheel radius estimates for each wheel separately, the depicted WRA module 5 transforms the relative wheel radii into wheel individual radius estimates and outputs the wheel individual deviation of those estimates from the calibration values.

Figure 2:
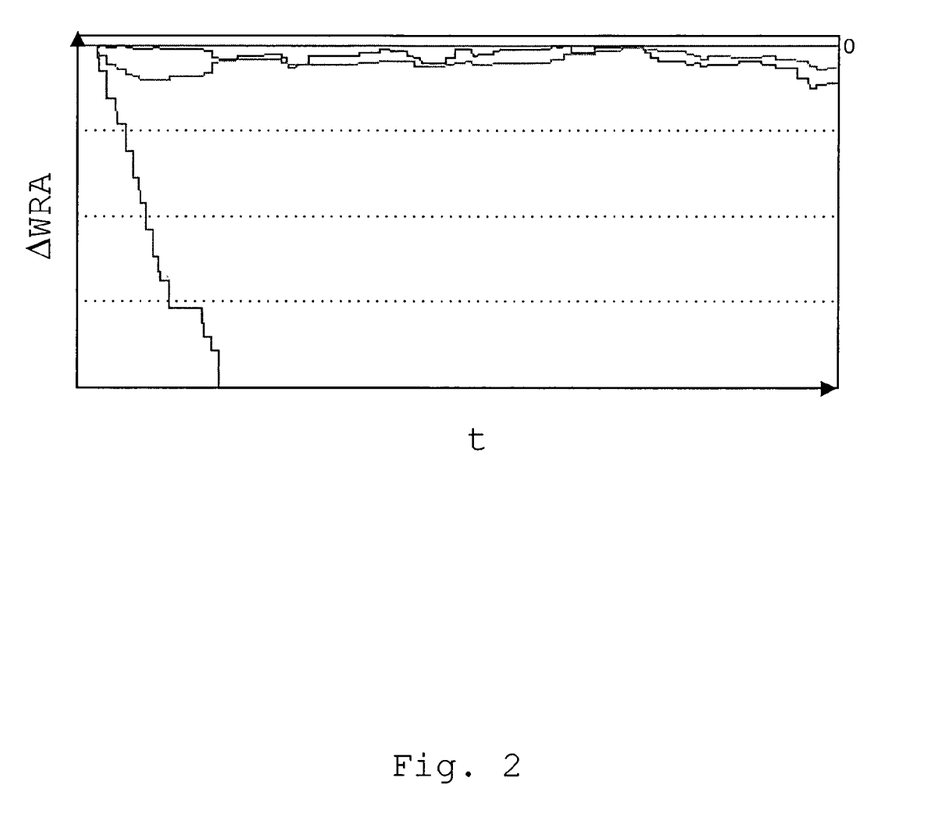
FIG. 2 shows an illustrative time course of output signals of the WRA module of FIG. 1 for a 1 W pressure deviating tire constellation.

FIG. 2 shows the time course of signals output by one embodiment of a WRA module 5 for an illustrative 1 W pressure deviating tire constellation. One of the output signals is constantly zero, because a normalisation is carried out by the WRA module 5 such that the signal corresponding to the tire with the least probability of having a pressure drop is set to zero. The other signals indicate estimations of an individual tire's pressure deviation with regard to the calibration values.

As can be seen, the course of one of the signals denotes clearly an increasing estimated pressure deviation of its corresponding tire.

Figure 3:
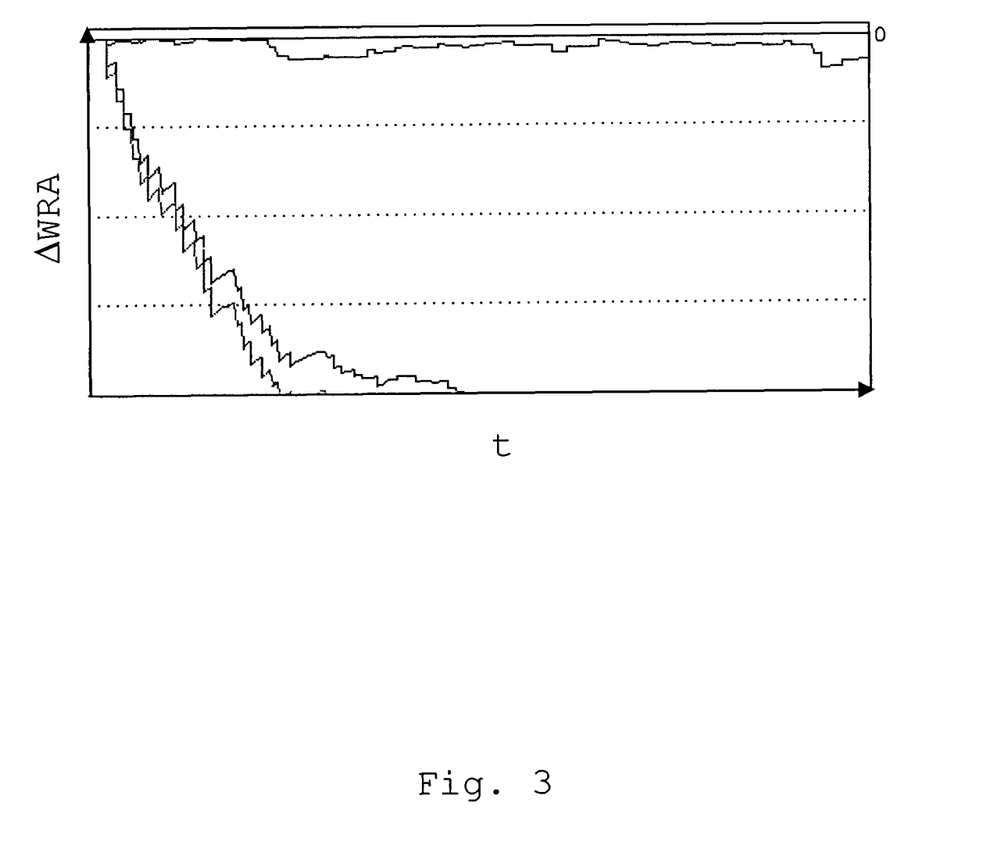
FIG. 3 shows an illustrative time course of output signals of the WRA module of FIG. 1 for a 2 W pressure deviating tire constellation.

FIG. 3 depicts the WRA signal output for an illustrative 2 W pressure deviating tire constellation. Again, the two signals corresponding to the concerned tires denote an increasing estimated pressure deviation.

Figure 4:
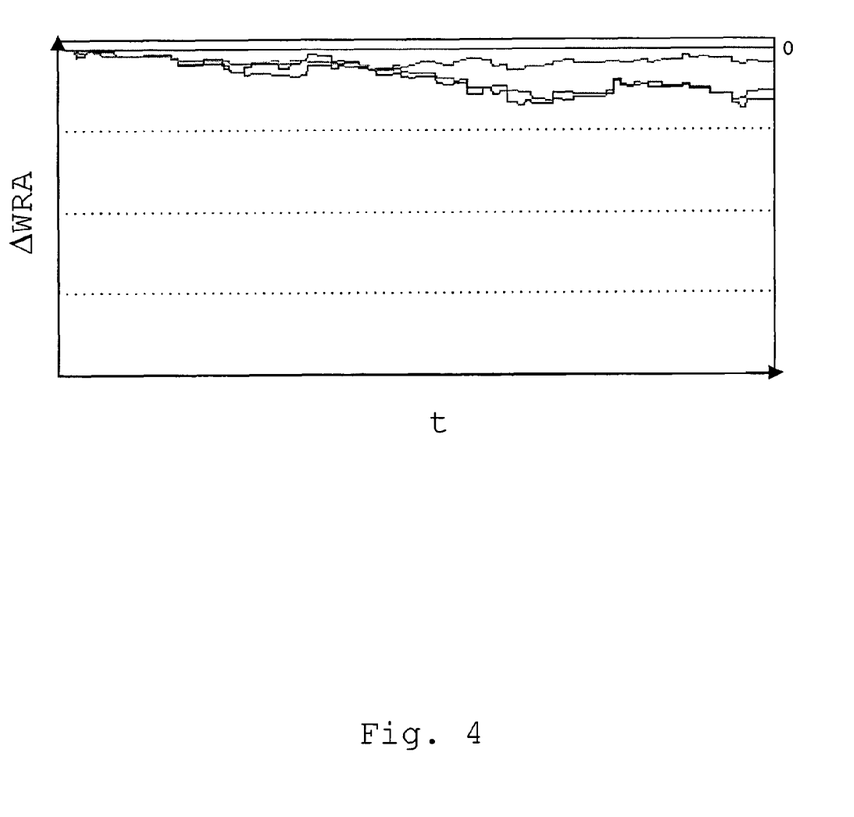
FIG. 4 shows an illustrative time course of output signals of the WRA module of FIG. 1 for a 4 W pressure deviating tire constellation.

The limits of the WRA evaluation are illustrated in FIG. 4 which shows the WRA signal output for an illustrative 4 W pressure deviating tire constellation: Since the wheel individual output signals are based on wheel relative estimations, they contain no information about simultaneous pressure deviations in all tires at the same time. A 4 W constellation cannot be recognised based on a WRA alone.

The WSA module 4 detects changes in the spectral properties of each of the four wheel angular velocity signals. The tire pressure has significant influence on the characteristics of the spectrum of the angular velocity signal; however, the road surface and the ambient temperature also have an impact on the angular velocity signal spectrum and should be considered.

By calculating first a parametric model of the wheel velocity spectrum and using the parameters of this model to calculate a spectral shape factor that condenses the different pressure dependent features of the spectrum into one single scalar quantity, the WSA module 4 detects in the illustrated embodiment changes in the tire pressure for each wheel individually.

Figure 5:
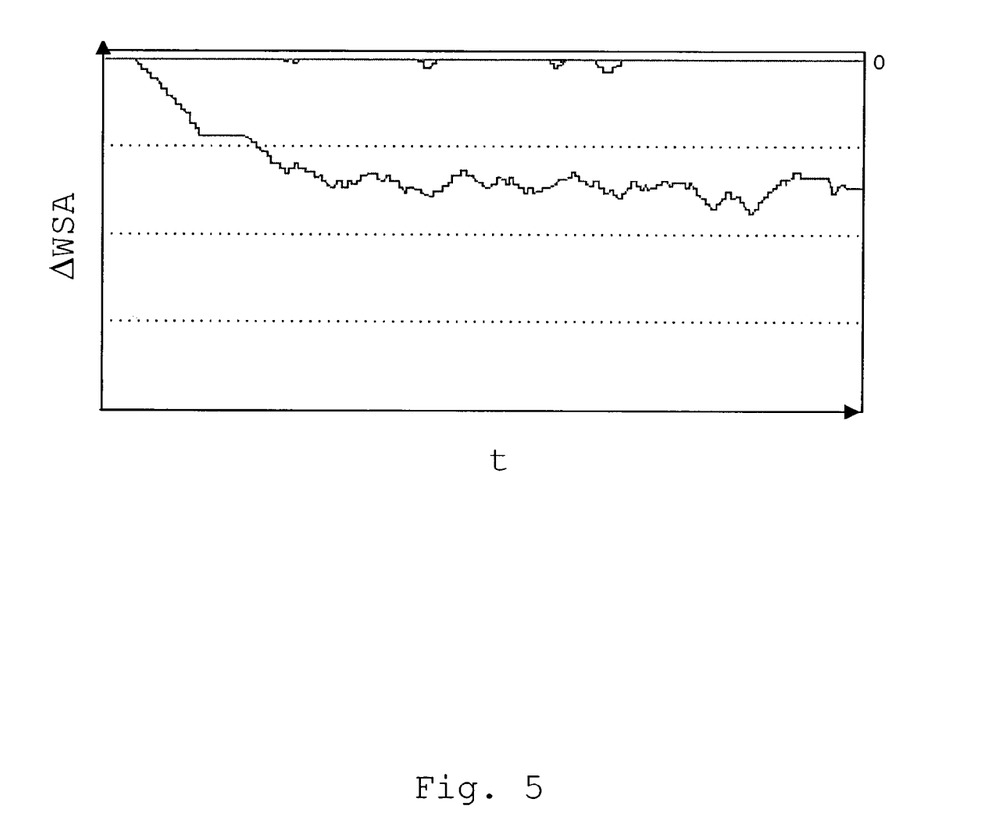
FIG. 5 shows an illustrative time course of output signals of the WSA module of FIG. 1 for a 1 W pressure deviating tire constellation.
Figure 6:
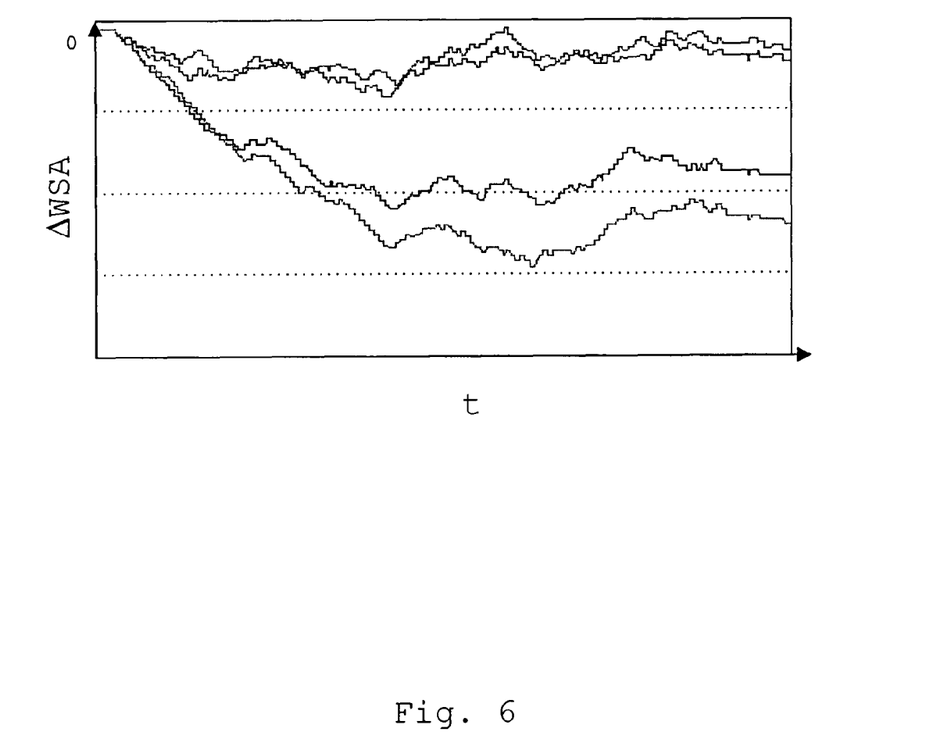
FIG. 6 shows an illustrative time course of output signals of the WSA module of FIG. 1 for a 2 W pressure deviating tire constellation.
Figure 7:
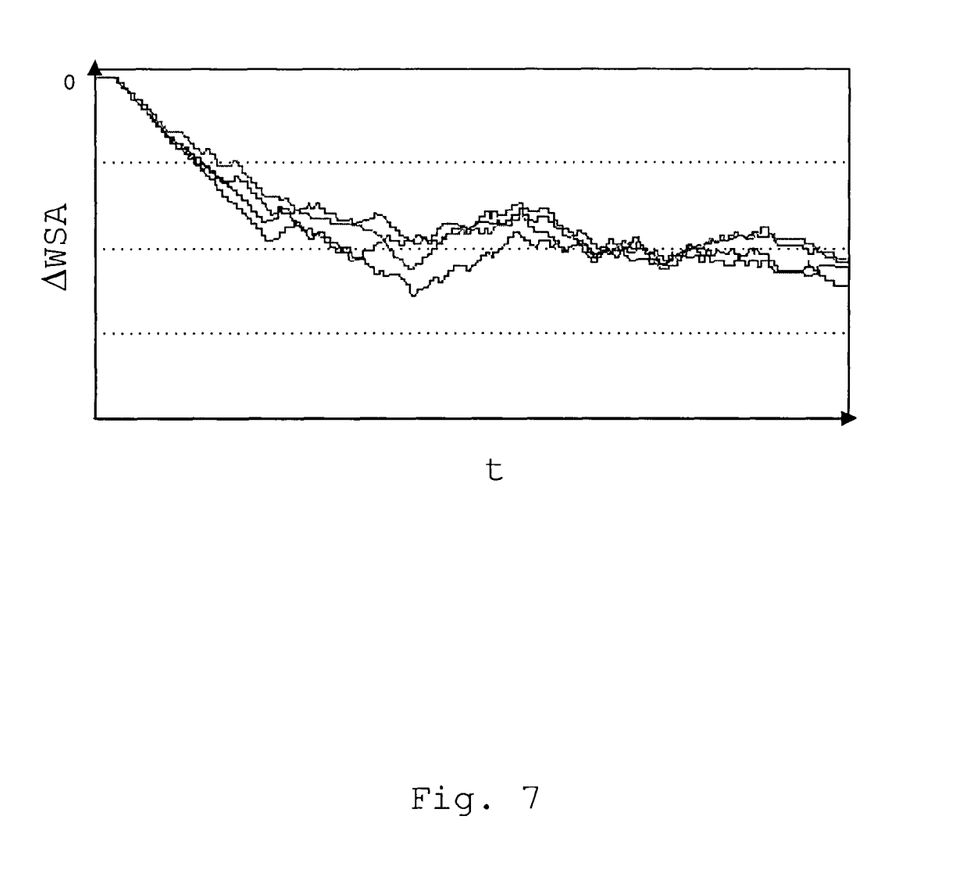
FIG. 7 shows an illustrative time course of output signals of the WSA module of FIG. 1 for a 4 W pressure deviating tire constellation.

FIGS. 5, 6 and 7 show the temporal course of illustrative output signals of the WSA module 4 for a 1 W pressure deviating tire constellation, a 2 W pressure deviating tire constellation, and a 4 W pressure deviating tire constellation, respectively. Each signal indicates the estimated pressure deviation of a particular tire with regard to the calibration values. In contrast to the WRA module 5, the WSA module 4 doesn't carry out a normalisation of the signal representing the tire with the least pressure deviation.

As can be seen, the WSA signals indicate pressure drops of the concerned tires for all of the above constellations; however, the indicated deviation from the "normal" signal levels is not as significant as those of the WRA signals.

In this embodiment, the WSA module 4 is active only for a certain range of vehicle velocities, for example, for the range of 50 to 150 km/h.

The warning unit 2 obtains data from the WRA module 5 and the WSA module 4. Based on these input data, it detects tire pressure deviations and outputs a warning to the API 3, if a tire pressure deviation is detected. In turn, the API 3 provides the data to external applications.

Of course, other embodiments of an inventive tire pressure monitoring system may include further or other components. For example, the configuration of WRA and WSA modules shown in FIG. 1 may be complemented by further modules that are able to infer pressure changes, e.g. by a wheel correlation analysis (WCA) module as known to the skilled person.

Figure 8:
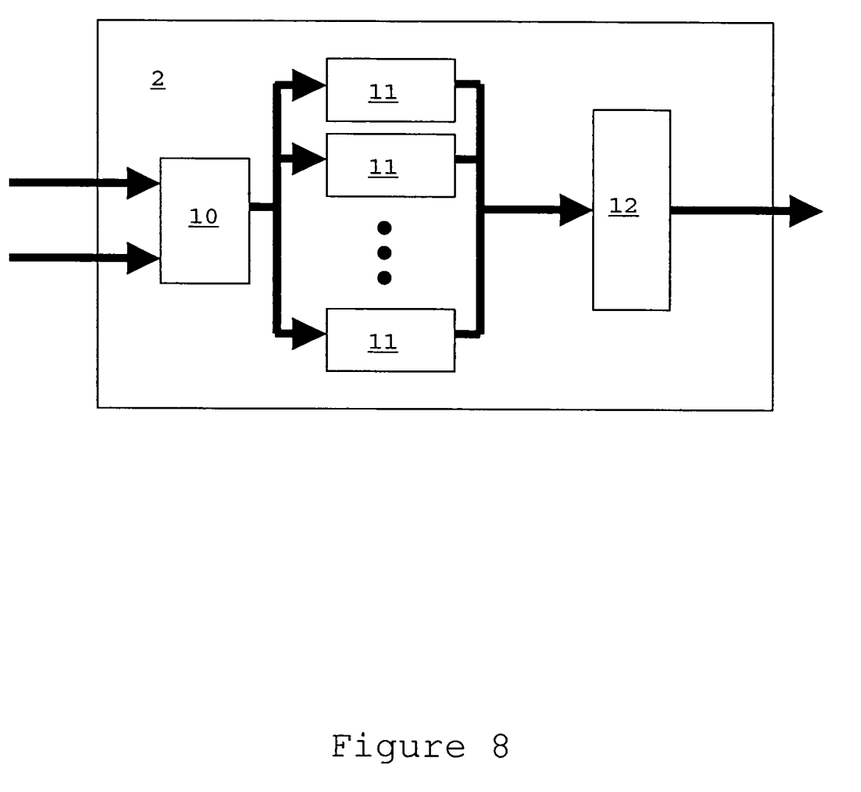
FIG. 8 shows a schematic data flow diagram of the warning unit of FIG. 1.

FIG. 8 illustrates a data flow diagram reflecting the internal structure of the warning unit 2 of FIG. 1.

The warning unit 2 comprises in the illustrated embodiment a load compensation unit 10 which obtains the data from WRA module 5 and WSA module 4. A load compensation of these data before they are provided to the detectors will improve the overall system performance, since load changes affect the roll radius of the wheel and the wheel velocity spectrum. Accordingly, load changes without load compensation may produce incorrect pressure deviation warnings.

The load compensation carried out in load compensation unit 10 is based on the observation that, while an increased load affects the roll radius similarly as a decreased tire pressure, the effect of an increased load on the wheel velocity spectrum is only partly the same as for a pressure decrease. Thus, a comparison of the data delivered from the WRA module 5 and the WSA module 4 in view of the mentioned observation may be able to compensate for load changes.

From the load compensation unit 10, the load compensated WSA and WRA signals are input to a plurality of pressure deviation detectors 11. Each detector is according to the illustrated embodiment designed and tuned to detect a particular pressure deviating tire constellation and to a particular pressure deviation situation.

Since the illustrated system is used for a four wheel vehicle, fifteen different pressure deviating tire constellations may occur (cp. above).

In particular, the illustrated embodiment uses five different detector types for the 1 W pressure deviating tire constellations (namely puncture, diffusion, flat tire, asymmetric and leakage during calibration detectors); and for each of the 2 W, 3 W and 4 W pressure deviating tire constellations two different detector types (namely puncture and diffusion detectors). In total, 4×5+(6+4+1)×2=42 detectors are in use which are each adapted to detect a particular pressure deviating tire constellation and a particular pressure deviation situation.

The detector types used in this embodiment and their adaptation to the different pressure deviating tire constellations are illustrated in the following.

[Puncture Detector Type]

The puncture detector type operates on a short time scale, typically in minutes, in order to detect rapid pressure deviations in one to four tires. The puncture detectors used for 1 W, 2 W and 3 W pressure deviating tire constellations are normally functions of WRA and WSA signals. Outside the active velocity range of WSA, only the WRA signals are used. As mentioned above, the WRA signals are based on four different relative estimations of the roll radii changes which are transformed to indicate pressure drops for each individual tire. Due to this relative nature of the WRA signals the 4 W puncture detector is in one embodiment a function of the WSA signals only.

The operation principle of a puncture type detector for detecting a 1 W pressure deviating tire constellation according to one embodiment of the invention is described referring to FIG. 9.

Since the WRA and WSA signals represent the estimated pressure deviations with regard to a calibration value, they are denoted in FIG. 9 with $\Delta$WRA and $\Delta$WSA. An exemplary progression in time of these signals is shown in FIGS. 9a and 9d, respectively.

Figure 9A:
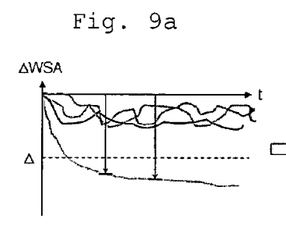
FIG. 9 shows six different graphs for illustrating the operation principle of a puncture detector type according to one embodiment of the invention.
Figure 9B:
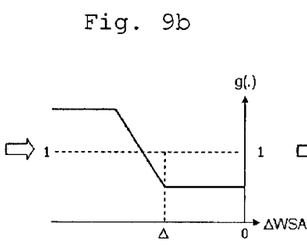
Figure 9C:
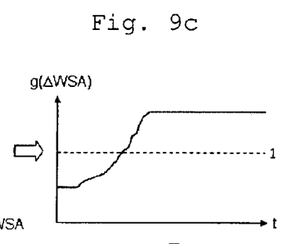
Figure 9D:
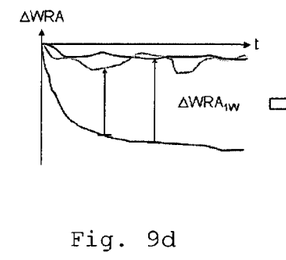
Figure 9E:
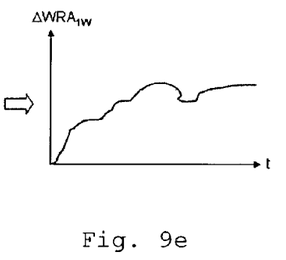

The 1 W puncture detector is based on the difference between the two WRA estimates $\Delta$WRA with largest magnitude, $\Delta\text{WRA}_{1W}$, which is shown in FIG. 9e. In the active velocity range of WSA, this quantity is multiplied by $g(\Delta\text{WSA})$. This function is depicted in FIG. 9c. FIG. 9b illustrates a typical choice of the function $g(\bullet)$ that returns a value below 1 in case of a small WSA deviation $\Delta$WSA (attenuation) and a value above 1 in case of a large WSA deviation $\Delta$WSA (amplification), wherein a WSA deviation $\Delta$WSA is considered "small" or "large" when it is smaller or larger than a defined deviation value $\Delta$, cp. FIG. 9a.

Figure 9F:
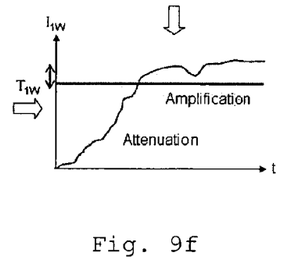

The multiplication of $g(\Delta\text{WSA})$ and $\Delta\text{WRA}_{1W}$ forms the 1 W puncture indicator $I_{1W}$ shown in FIG. 9f:

$$I_{1W} = \Delta\text{WRA}_{1W} \times g(\Delta\text{WSA}). \quad (1)$$

The 1 W puncture indicator value is continuously compared to a 1 W threshold, $T_{1W}$. If $I_{1W} > T_{1W}$, a 1 W puncture warning is called.

When WRA alone is active, the puncture indicator value may be computed as described above. In this case, it might be advantageous to attenuate the indicator value by a fixed multiplicative amount.

In the described embodiment, four 1 W puncture detectors are used for detecting a puncture situation at the front left tire, at the front right tire, at the rear left tire, and at the rear right tire, respectively. These 1 W detectors differ from each other in that they may be tuned to observe only the WRA and WSA signals corresponding to the respective tire and the deviation of these signals with regard to the WRA and WSA signals corresponding to the other tires. From this, an individual indicator value for each 1 W pressure deviating tire constellation may be calculated, such that each 1 W detector calls a warning only if a pressure deviation of its corresponding tire occurs.

The outlined 1 W puncture detection approach may also be the basic working principle behind the 2 W and 3 W puncture detectors. However, in contrast to the 1 W puncture detector, the 2 W and 3 W detectors may be based on the difference between the second and the third largest WRA estimates and the difference between the third largest and the smallest WRA estimates, respectively. If, as in the described embodiment, one detector per 2 W and 3 W pressure deviating tire constellation is provided, the individual detectors may, as in the 1 W case, calculate individual indicators for each pressure deviating tire constellation based on the WRA and WSA signals corresponding to the tires involved in the corresponding pressure deviating tire constellation and their deviation with regard to the other WRA and WSA signals.

The 4 W puncture detector may be based solely on the WSA estimates. One embodiment of the detector considers two different criteria in parallel. The first one checks whether the smallest WSA deviation exceeds a threshold, min $(I4_{WLev})>T_{4WLev}$, and the second one that the sum of the WSA deviations for each wheel exceeds another threshold, $I_{4WSum}>T_{4WSum}$. Alternatively, the 4 W detector may be based on WSA information from a subset of the four wheels, e.g. one of the non-driven wheels or the wheels on the same axle, and use WRA information from this subset to verify that indeed the 4 W pressure deviation situation is described by the chosen subset.

Other embodiments of a puncture detector may use other criteria to detect a pressure deviation scenario.

[Diffusion Detector Type]

The diffusion detectors operate on a long time scale, typically hours, to detect slow pressure loss or increase in one to four tires. The 1 W, 2 W and 3 W diffusion detectors are functions of the WRA and the WSA signals, while the 4 W diffusion detector is a function of the WSA parameters only.

All these detectors operate according to most embodiments of the invention in the same manner as the corresponding puncture detectors with two major differences in terms of the used WRA and WSA signals: the used WSA and WRA signals adapt slower to reflect the longer time scale and the WSA signals require data from a wider velocity range.

[Flat Tire Detector Type]

Flat tire detectors operate on a very short time scale in order to detect rapid and large pressure drops in one tire. The flat tire detectors are functions of the WRA signals only.

The flat tire detectors use information from the most recent WRA estimate to form a 1 W flat tire indicator computed as the difference between the two WRA estimates with largest magnitude. If this difference exceeds a threshold for a defined number of consecutive estimations, then a 1 W puncture warning is called.

[Asymmetric Detector Type]

The 1 W asymmetric detectors may complement the puncture and diffusion detectors to enhance the detection performance in asymmetric tire pressure deviation situations. An example of such a situation is when the pressure drop in one tire is 15% and in another tire 30%. These detectors are functions of the WRA and the WSA signals.

The 1 W asymmetric detectors are based on the WRA estimate with largest magnitude. The detector computations are in principle the same as for the 1 W puncture and diffusion detectors, but the updates require that both WRA and WSA are active. Detection also requires a distinct deviating pressure indication from both WRA and WSA, such that both subsystems point out the same wheel. The computed indicator is also compared to a threshold.

[Leakage During Calibration Detector Type]

The leakage during calibration detector detects a continuous pressure drop in one wheel during the system calibration phase. Such a phase is necessary for indirect pressure monitoring systems in order to learn the nominal pressure conditions. Usually, a calibration should be executed whenever a change has been made to the tire pressures, tires or wheels.

Leakage during calibration is a function of the WRA signals.

The basic principle of this detector is to monitor the largest roll radius gradient $S_{1WLeak}$ computed with respect to time and compare this to a threshold for a limited period of time after that calibration was initiated. If $S_{1WLeak}$ is greater than the threshold during the limited period of time, then a 1 W leakage during calibration condition is inferred.

Of course, other embodiments of the invention may—in addition to or instead of the described detector types—use any number of different detector types or variations or modifications of the described detector types. As an example for additional detector types, some embodiments of the invention may include detectors for detecting misuse and malfunction situations.

For the embodiment of FIG. 2 there is used, as mentioned above, one detector of each detector type per possible 1 W pressure deviating tire constellation. For the possible 2 W, 3 W and 4 W constellations, only puncture and diffusion type detectors are used. Other embodiments of the invention use only some, or one, or all of the indicated detector types per possible pressure deviating tire constellation; in some embodiments, more pressure deviating tire constellations than detectors exist, such that at least one detector of any of the above detector types is arranged to detect more than one pressure deviating tire constellation. For example, each provided detector may be tuned to detect either all 1 W pressure deviating tire constellations, or all 2 W constellations, or all 3 W constellations, or the 4 W constellation. That is, e.g. a puncture detector, a diffusion detector, a flat tire detector, an asymmetric detector and a leakage during calibration detector may each be tuned to detect all 1 W constellations, a puncture and a diffusion detector may be tuned to detect all 2 W constellations, and so on, such that a total number of 5+2+2+2=11 detectors is required. Alternatively, two detector groups are provided, wherein each detector of the first group is tuned to detect a particular pressure deviating tire constellation regardless of the pressure deviation situation, and each detector of the second group is tuned to detect a particular pressure deviation situation, regardless for which pressure deviating tire constellation. Of course, other arrangements or combinations of the above arrangements are also possible.

In the illustrated embodiment, however, each detector 11 is optimised for detecting its respective pressure deviating tire constellation in a particular pressure deviation situation and therefore delivers a highly reliable performance. The optimisation of the individual detectors 11 of the different detector types for detecting particular pressure deviating tire constellations may in addition to the aspects mentioned above include for example an adaptation of the threshold and indicator parameters to tire specific conditions which are due e.g. to unbalanced load etc. based on data obtained e.g. during the calibration phase or from the vehicle CAN bus.

The tire pressure monitoring system 1 may further comprise a control unit which is not shown and may for example be implemented as a software routine. This control unit determines inter alia whether a detected pressure deviating tire constellation is plausible etc., or if a warning should be reset, e.g. when the present WRA and WSA signals are sufficiently close to the calibration condition. Further, the control unit may complement the default evaluation Indicator I>Threshold T of the detectors with a function that is guarantees that this condition has been true for a sufficiently long time before a warning is called in order to render the detectors more robust and to avoid nuisance warnings. Preferably, this is implemented using a counter which starts at a predefined value and counts down to zero at a certain rate as long as the condition I>T is true. The counter may use a fixed rate or be adaptive. In the latter case, the adaptation may, as an example, depend on the difference I−T or on other parameters such as speed and ambient temperature. The counter may further be one-directional (i.e. only counting down) or bi-directional (i.e. able to count both up and down). In the latter case, the rate may be different depending on the direction and it may also include some hysteresis means that further control the counting up and down.

Preferably, the control unit may also be able to adapt different detector parameters of all or of individual detectors in reaction to external influences. Data on which the adaptation may be based can be obtained for example from memory module 9 of the tire pressure monitoring system 1.

For example, the thresholds of the detectors to which the indicator values are compared, or the indicator values themselves may be adapted to temperature changes, driving situations (speed, accelerations, braking etc.), road conditions, quality of input signals, driver inputs, control commands from other systems and ECUs in the vehicle, time since start, time since last calibration etc. These can all be described as modifications of the indicator or threshold values realised as functions of basic indicators $I_{default}$ (which are e.g. calculated as indicated above) or thresholds $T_{default}$, i.e. $I_{modified}=f(I_{default})$ and $T_{modified}=g(T_{default})$. Examples of the functions $f(\cdot)$ and $g(\cdot)$ are simple multiplicative or additive functions, delay operators (e.g. simple delay operators or implemented using counters), logical operators (e.g. if speed <10 km/h then 0, else 1), look-up tables, or combinations of the above examples.

It is, according to one embodiment of the invention, further advantageous to use temperature dependent indicators and/or thresholds and/or evaluation rules to improve the performance of the individual detectors and the overall system. The temperature dependence may either be on the current (ambient) temperature, $T_{current}$, or on the difference between the current and the temperature during calibration, $\Delta T=T_{current}-T_{calibration}$. The temperature that matters is the air temperature inside the tires. If a vehicle has no temperature sensors inside the tires, as is often the case for vehicles using indirect tire pressure monitoring systems, information from other available temperature sensors may be used, e.g. from a normal ambient temperature sensor coupled to a car's instrument cluster, or from air temperature sensors in the intake manifold of the vehicle engine. Even information from virtual sensors that estimate the temperature inside the tires using mathematical models of heat build-up during braking and accelerations may be used.

For example, some detectors may be less suitable to use in extreme cold and/or warm conditions. The corresponding detectors can then be modified using a multiplicative function, $h(T_{current})$, that is 1 when $|T_{current}|<T_{limit}$ and 0 otherwise: $I_{modified}=I_{default}\times h(T_{current})$. Another choice of $h(\cdot)$ is to let it be a function of $\Delta T$ and to emphasise data coming from similar (temperature) conditions as during the calibration. Typically then $0\leq h(\Delta T)\leq 1$ and $h(0)=1$ and decreasing with increasing $|\Delta T|$, for example $h(\Delta T)=\exp(-\gamma|\Delta T|)$, where $\gamma$ is a constant. To use the fact that pressure increases with increasing temperature and vice versa, a non-symmetric function $h(\Delta T)$ may be used, for example $h(\Delta T)=1-\alpha\Delta T$ for $\Delta T\geq 0$ and $=1-\beta\Delta T$ for $\Delta T<0$, where $\alpha$ and $\beta$ are suitably chosen constants.

The control unit may also activate or deactivate individual detectors, for example in response to an external access. Thereby, the tire pressure monitoring system 1 may be adapted to the requirements of different vehicle models or markets or legislative requirements.

When the control unit determines that a plausible pressure deviating tire constellation is detected, output data indicating a pressure deviation warning is provided to an output unit 12 which in turn provides the warning to the API 3 of FIG. 1. In this embodiment, the output unit 12 is an OR logic. Of course, any other output unit may be used, provided that it is able to provide the output data to external devices, programs etc. such that a vehicle user may be informed about the pressure deviations, or such that the warning data may be processed otherwise.

The output data may also include information about a warning level, if the inventive system, method or computer system distinguishes two or more warning levels. If, for example, a pressure drop is slow, a low priority warning may be output in order to inform the user about the current pressure deviation situation and to advice him or her to drive to the next garage; a continuation of the drive for limited time period is not dangerous. In case of a rapid pressure loss, an urgent warning may be given to the user to stop the vehicle to immediately. It may be desirable to define a lower threshold for the detection of a low priority warning.

In other embodiments of the invention the warning levels are defined differently.

According to one embodiment of the invention, the warning is levels may be assigned to different detector types, i.e. a warning of a particular detector type always produces a warning of a particular level. For instance, the above flat tire and leakage during calibration detectors may always call high priority warnings, while the puncture, diffusion and asymmetric detectors have mechanisms for evaluating the actual pressure scenario and either call low priority warnings or high priority warnings: The diffusion detectors, which are based on signals that adapt rather slowly, in one embodiment first set a low priority alarm. If the user continues to drive for a sufficiently long time in this condition or if the pressure deviation exceeds a second level, a high priority warning may be called. For the puncture and asymmetric detectors the warning level may be decided by looking at the difference between the computed puncture and the diffusion indicators. If these indicators are similar enough, a low priority warning is called; otherwise, or if the puncture indicator falls below a second threshold, a high priority warning is set.

The functionality of deciding the warning level may be implemented for example by the control unit, by the output unit (12) or by the detectors (11).

Summarising, the invention allows a precise and reliable detection of an occurring pressure deviating tire constellation in many tire pressure deviation situations. The modular arrangement of the detectors renders the inventive system, method and computer program highly flexible since it allows e.g. the specific tuning and optimisation of the single detectors for particular situations and constellations, the optional activation/deactivation etc. of the single detector components, and suitable modifications or adaptations of the different detectors for example to driving situations and ambient conditions.

What is claimed is:

1. A system for detecting tire pressure deviations in a number of tires of a vehicle wherein a plurality of possible tire constellations of one or more pressure deviating tires exists, the system comprising:
   a plurality of separate pressure deviation detectors, wherein at least one pressure deviation detector is provided for and assigned to each of the possible tire constellations existing on the vehicle, wherein a unit for roll radius based tire pressure monitoring and a wheel spectrum analysis module are arranged to provide data to the plurality of pressure deviation detectors, wherein the provided data from the wheel spectrum analysis module is based on the wheel spectrum analysis module first calculating a parametric model of a wheel velocity spectrum and using parameters of the parametric model to calculate a spectral shape factor that condenses different pressure dependent features of the wheel velocity spectrum into one single scalar quantity such that the wheel spectrum analysis module detects deviations in the tire pressure for each tire individually, and wherein each pressure deviation detector is optimised to detect a particular one of the possible tire constellations to which it is assigned and to detect deviations in the tire pressure of its respective tire constellation based on the provided data; and an output unit configured to provide a warning if one of the plurality of pressure deviation detectors detects its respective tire constellation deviating from a predetermined tire pressure.

2. The system according to claim 1, including a unit for determining a warning level in dependence on the pressure deviations detected by the system, wherein, if one of the plurality of pressure deviation detectors detects its assigned tire constellation deviating in pressure, the output unit additionally provides information specifying the warning level.

3. The system according to claim 2, wherein the unit for determining the warning level provides a low priority warning level, if the detected pressure deviation exceeds a first predetermined threshold, and a high priority warning level, if the detected pressure deviation exceeds a second predetermined threshold which is greater than the first threshold, or if the detected pressure deviation has exceeded the first threshold for a predetermined time period.

4. The system according to claim 1, wherein the plurality of pressure deviation detectors further comprise different detectors configured to detect different pressure deviation situations, the different detectors comprising at least one of a puncture detector for detecting rapid pressure deviations, a diffusion detector for detecting slow pressure deviations, a flat tire detector for detecting rapid and large pressure deviations, an asymmetric detector for detecting asymmetric pressure deviations, a calibration detector for detecting leakage during calibration, and a tire size detector for detecting different tire sizes.

5. The system according to claim 1, comprising a plurality of different detectors assigned to each possible tire constellation.

6. The system according to claim 1, further comprising a control unit for activating and/or deactivating any of the plurality of pressure deviation detectors and/or for configuring the plurality of pressure deviation detector parameters in response to vehicle parameters, driving situations, external commands or other external influences.

7. The system according to claim 1, further including a load compensation unit connected to the plurality of pressure deviation detectors.

8. A method for detecting tire pressure deviations in a number of tires of a vehicle wherein a plurality of possible tire constellations of one or more pressure deviating tires exists, the method comprising:

detecting the tire pressure deviations in each of the plurality of possible tire constellations using a plurality of separate pressure deviation detectors, wherein at least one pressure deviation detector is provided for and assigned to each of the possible tire constellations existing on the vehicle, wherein a unit for roll radius based tire pressure monitoring and a wheel spectrum analysis module are arranged to provide data to the plurality of pressure deviation detectors, wherein the provided data from the wheel spectrum analysis module is based on the wheel spectrum analysis module first calculating a parametric model of a wheel velocity spectrum and using parameters of the parametric model to calculate a spectral shape factor that condenses different pressure dependent features of the wheel velocity spectrum into one single scalar quantity such that the wheel spectrum analysis module detects deviations in the tire pressure for each tire individually, and wherein each pressure deviation detector is optimised to detect a particular one of the possible tire constellations to which it is assigned and to detect deviation in the tire pressure of its respective tire constellation; and providing a warning if one of the plurality of pressure deviation detectors detects its respective tire constellation deviating from a predetermined tire pressure.

9. The method of claim 8, comprising determining a warning level in dependence on the detected pressure deviations and, if one of the plurality of pressure deviation detectors detects its assigned tire constellation deviating in pressure, additionally providing information specifying the determined warning level.

10. The method according to claim 8, comprising activating and/or deactivating the plurality of pressure deviation detectors in response to external signals and/or changing the plurality of pressure deviation detector parameters in response to external requests or driving/vehicle conditions.

11. The method according to claim 8, comprising detecting different deviation situations using the plurality of pressure deviation detectors which further comprise different detectors that are configured to detect different pressure deviation situations, the different detectors comprising at least one of a puncture detector for detecting rapid pressure deviations, a diffusion detector for detecting slow pressure deviations, a flat tire detector for detecting rapid and large pressure deviations, an asymmetric detector for detecting asymmetric pressure deviations, a calibration detector for detecting leakage during calibration, and a tire size detector for detecting different tire sizes.

12. The method of claim 11, wherein each respective pressure deviation detector assigned to its respective tire constellation comprises several of the different detector types.

13. The method of claim 8, comprising activating and/or deactivating any of the plurality of pressure deviation detectors and configuring the plurality of pressure deviation detector parameters in response to vehicle parameters, driving situations, external commands or other external influences.

14. A non-transitory computer readable storage medium storing a computer program for detecting tire pressure deviations in a number of tires of a vehicle wherein a plurality of possible tire constellations of one or more pressure deviating tires exists, the computer program storing instructions which when executed by a processing system cause the processing system to perform a method comprising:

detecting the tire pressure deviations in each of the plurality of possible tire constellations using a plurality of separate pressure deviation detectors, wherein at least one pressure deviation detector is provided for and assigned to each of the possible tire constellations existing on the vehicle, wherein a unit for roll radius based tire pressure monitoring and a wheel spectrum analysis module are arranged to provide data to the plurality of pressure deviation detectors, wherein the provided data from the wheel spectrum analysis module is based on the wheel spectrum analysis module first calculating a parametric model of a wheel velocity spectrum and using parameters of the parametric model to calculate a spectral shape factor that condenses different pressure dependent features of the wheel velocity spectrum into one single scalar quantity such that the wheel spectrum analysis module detects deviations in the tire pressure for each tire individually, and wherein each pressure deviation detector is optimised to detect a particular one of the possible tire constellations to which it is assigned and to detect deviation in the tire pressure of its respective tire constellation; and providing a warning if one of the plurality of pressure deviation detectors detects its respective tire constellation deviating from a predetermined tire pressure.

\* \* \* \* \*